(12) United States Patent
Crosato

(10) Patent No.: US 9,624,459 B2
(45) Date of Patent: Apr. 18, 2017

(54) METHOD OF PROCESSING A CRUSHED VEGETABLE MATERIAL HAVING A LIQUID AND SOLID PART

(71) Applicant: NOFORM SRL, Meolo (VE) (IT)

(72) Inventor: Remo Crosato, Meolo (IT)

(73) Assignee: NOFORM SRL, Meolo (VE) (IT)

( * ) Notice: Subject to any disclaimer, the term of this patent is extended or adjusted under 35 U.S.C. 154(b) by 112 days.

(21) Appl. No.: 14/070,907

(22) Filed: Nov. 4, 2013

(65) Prior Publication Data

US 2014/0127372 A1 May 8, 2014

(30) Foreign Application Priority Data

Nov. 2, 2012 (IT) ................ TV2012A0206

(51) Int. Cl.
| | | |
|---|---|---|
| *C12G 1/02* | (2006.01) | |
| *C12G 1/00* | (2006.01) | |
| *C12G 1/036* | (2006.01) | |
| *A23N 1/02* | (2006.01) | |

(52) U.S. Cl.
CPC ............... *C12G 1/02* (2013.01); *A23N 1/02* (2013.01); *C12G 1/00* (2013.01); *C12G 1/005* (2013.01); *C12G 1/0206* (2013.01)

(58) Field of Classification Search
CPC .......... C12G 1/00; C12G 1/02; C12G 1/0206; C12G 1/005; A23N 1/02
See application file for complete search history.

(56) References Cited

U.S. PATENT DOCUMENTS 3,741,770 A * 6/1973 Olphen ..................... 426/15

FOREIGN PATENT DOCUMENTS

| EP | 438111 | * | 1/1991 |
| FR | 2826665 | * | 2/2004 |
| WO | WO 2010/052739 A1 | | 5/2010 |

OTHER PUBLICATIONS

English Translation for FR 2826665 published Feb. 2004.*

* cited by examiner

*Primary Examiner* — Anthony Weier

(74) *Attorney, Agent, or Firm* — Birch, Stewart, Kolasch & Birch, LLP

(57) ABSTRACT

A method for processing a crushed vegetal material, which has a solid part and liquid part and is placed inside a container, includes increasing the gas pressure inside the container so that the gas dissolves or diffuses in the liquid part; and decreasing the gas pressure inside the container.

17 Claims, 8 Drawing Sheets

METHOD OF PROCESSING A CRUSHED VEGETABLE MATERIAL HAVING A LIQUID AND SOLID PART

The invention relates to a method of processing a crushed vegetable material having a liquid and solid part, in particular a method of maceration and/or pressing, and to the apparatus or system to carry it out, and even more in particular in the field of winemaking here chosen as an example.

Winemaking consists basically of three steps:
1) maceration of the crushed vegetable material;
2) alcoholic fermentation of the crushed vegetable material;
3) pressing of the exhausted marc at the end of the alcoholic fermentation.

For the first step, traditional maceration systems envisage the saturation with inert gas of a tank then filled with the crushed material that stays therein for a period usually ranging from 12 hours to 10 days, without fermentation processes being activated. The limits of this technique are related to the fact that the must introduced into the maceration tank is not de-oxidized completely (during the crushing operation of grapes the liquid part of the crushed material absorbs a large quantity of oxygen). The consequent possible proliferation of acetic bacteria is able to degrade the final quality of the wine and/or oxidize it. The danger is concrete, since the traditional maceration is usually long (48 hours to 10 days) and the longer the crushed material stays in the tank without real de-oxidation the higher the probability of proliferation.

After completion of the maceration, fermentation begins and, finally, a phase of pressing the marc occurs.

The traditional pressing systems, such as presses and membrane presses (see e.g. EP2342071), can be operated by inflation of a membrane or by creation of vacuum in a draining pipe. Or the membrane is pressurized which, in turn, presses the marc or solid part against draining sectors to make the juice come out, or vacuum is created in the vicinity of these sectors, usually in a pipe located downstream. The vacuum sucks the liquid part present in marc from the draining areas into the drainage pipe. During mechanical pressing the marc is compacted against the draining sectors and shortly it plugs the holes thereof, preventing the drainage of other must. Not only the extraction of liquid gets limited, but also very high pressure or vacuum are used with the result of pulping the skins and of extracting bitter and herbaceous flavors. In the presses, also, the must gets oxidized by contact with air, and in general it is necessary to accept a degree of oxidation of the must without chance to improve it.

Therefore it is desired to provide a method, which improves this state of the art, as defined in claim 1, by which during the maceration phase of the crushed vegetable material one has the advantage of:
- decreasing oxidation of the extracted must and/or;
- reducing the proliferation of bacteria harmful to winemaking, and/or
- improving the extraction of polyphenolic substances and colorants from the peel without extracting substances with herbal and astringent taste, thereby increasing the extraction speed;

while in the pressing phase of the solid part (e.g. marc) one has the advantage of increasing the amount of liquid extracted from the solid part in a smooth way, i.e. without the use of membranes or traditional pressing mechanical organs.

The method is useful for processing a solid (and/or wet) part and a liquid part of a crushed vegetal material placed inside a main container and has the steps of
(i) increasing the gas pressure inside the container so that the gas dissolves o diffuses in said liquid part;
(ii) decreasing the gas pressure inside the container e.g. through a vent (preferably equipped with valve means) placed on the upper part of the container (for the macerative phase) or through a vent (preferably equipped with valve means) placed on the lower part of the container and near a draining septum (for the pressing phase).

Preferably in step (i) the gas pressure inside the container is increased by injection of external gas, although e.g. fermentation gas generated by the same crushed grapes (e.g. $CO_2$) can be reused when alcoholic fermentation has already begun. This is particularly advantageous if one wants to transfer the must by using the pressure and saturation generated by the $CO_2$ during "delestage" fermentation operations.

Step (i) can be carried out by injecting a gas, preferably inert gas e.g. $CO_2$, nitrogen, argon or mixtures of these or other gas, into the container. If the pressing stage is on and if alcoholic fermentation is still active, one can conveniently use fermentation $CO_2$ to saturate with gas naturally the marc. Preferably the gas is let in at the bottom of the container where in use there is the crushed vegetable material. By pressurizing said container with said gas the gas dissolves and/or diffuses in the liquid part (e.g. both in proportion to its capacity of saturation and at the desired pressure).

An optional step (called "waiting" phase) envisages to wait for some time $T_{att}$, e.g. $T_{att}>=60$ seconds, between the phases (i) and (ii), e.g. from when the desired pressurization in the container is reached. The waiting phase has the object to allow a correct saturation of the gas in the liquid part of the pressed mass.

In the following, if not specified, it is meant that the container referred to is the above container, that is the main one.

The steps (i) and (ii) achieve—as said—the effect that the gas dissolves or diffuses into the liquid (hereafter said interstitial in the case of pressing) that humidifies and/or permeates and/or wets the solid part (Henry's law), and thus saturates the must. In other words, the method exploits the physical property of gases to dissolve in liquids (and thus also in the interstitial fluid that stays in the solid part and in the interstices of it, e.g. the alveoli that are formed inside the skin of a pressed grape) whenever these are subjected to pressure (Henry's law).

By applying the method during pre-fermentative macerative phase of the crushed material, the injection and/or diffusion of the gas in the mass contained in the container and the consequent pressurization of the container carried out by the gas determines, especially after a proper time $T_{att}$, the saturation of the mass with diffused gas in it (Henry's law). By decreasing the pressure in the container (e.g. by degassing or venting it) the gas dissolved in the liquid mass returns from liquid to gas. The microbubbles of gas, while going up in the mass, aggregate oxygen molecules trapped in the mass itself. This operation, e.g. repeated for n cycles, determines a complete de-oxidation of the mass of crushed grapes. In addition, cycles of pressurization and depressurization (i.e. the step (i) and (ii)) break up the pulp of the peel in a soft manner and perform a better extraction, the time interval being equal, than the noble compounds present in the pulp and peel.

Note that in the case of pressing the gas injection or diffusion, unlike the prior art, occurs to make a gas diffuse inside a volume pressurized by the gas, which volume is occupied by, or consists of interstices of, the solid part, and not just of the void volume of the container. To increase the percentage of the injected gas that acts on the interstitial fluid (during step ii), gas can be injected in one or more points inside the volume occupied by the solid part e.g. by pipes or nozzles or spreaders that flow in inner points of the lower part of the container, e.g. at the center thereof.

As already mentioned, preferably before step (ii) a certain time $T_{att}$ is waited for before the desired pressure is reached, to allow some time to the gas for completing or achieving a sufficient degree of dissolution in the interstitial fluid. E.g. a $T_{att}$ can be waited for after finishing the injection of gas and/or having achieved the increase of its pressure up to a predefined threshold, or the injection of gas or the pressure rise is performed in a time $T_{att}$. The effect is to increase the effects of extraction, both of $O_2$, through the unchaining of bubbles, and of interstitial fluid.

Then by decreasing the pressure of the gas inside the container, e.g. suddenly, the gas previously diffused into the solid mass reacts coming out of it and bringing with it the interstitial fluid. In general the pressure can be decreased by venting to the outside the container at a point or an upper part where in use only gas is present. E.g. said point or upper part (where in use only gas is present) may be the roof of the container or the adjacent vertical walls, e.g. in the neighborhood of, or in the belt up to 1 m from the roof and/or within the belt between the roof and the 25% or 35% of the height of the container from the roof.

A big advantage is that, by using e.g. $CO_2$ or nitrogen as gas, not only the pulp or the solid part is not mechanically pulped, but the molecules of $O_2$ aggregate to those of $CO_2$ and/or nitrogen during the exit from the solid part. It follows that the gas also de-oxidizes the solid part, improving the quality of the extracted liquid (e.g. the wine). This effect can be exploited especially during the maceration phase of the solid part. The advantage compared to the known systems is that the gas permeates from the inside, and more, the solid part (eventually the whole of it) and not only a thin surface layer.

If the step (ii) occurs putting into communication the container with an environment at atmospheric pressure, e.g. the exterior of the container, one can have on the solid part only the de-oxidant effect and/or scrambling or opening effect of the solid part given by inner jerks due to variations in pressure and/or escape of gas.

Note that the mixing, which favors uniform extraction of oxidants, is delicate, because it does not involve a mechanical device that moves the solid part but pressure waves of a gas.

Additionally the gas, in its transition from liquid to gas, "opens" the solid part or marc. This divaricating effect increases the surface area exposed to the gas of the solid part and enhances the extraction yield of oxidants.

The phase (i) and/or (ii) can also take place by migrating gas in/from an inflatable bag, and/or by varying mechanically the volume of the container, and/or by using a controlled connection with a second auxiliary container (open or closed) at a lower or higher pressure.

It is preferable to inject the gas so that it comes out at the center of the main container, or at least within a cylindrical volume located around the central vertical axis of the tank and away from the side walls, e.g. the volume having a radius ⅓ to ⅔ of the radius of the container.

The method is not only usable for deoxidizing the must and to obtain greater extraction of noble compounds from the peel during maceration (e.g. by opening one or more valves placed on top of the container for its controlled pressurization/depressurization), but it is also at the base—as we said—of a process to extract or to drain selectively the remaining part of must/liquid (e.g. the juice of pressing or the interstitial liquid) still present in the marc or solid part (e.g. the peel), without extracting the aromas and tastes of herbs normally extracted with presses or traditional presses. In this case the phase (ii) still determines the transition from liquid to the gaseous state of the gas dissolved in the interstitial fluid, and such transition allows excellent extraction of interstitial fluid from the solid part. The gas spread with capillarity in the interstitial fluid inside the solid part during step (i), and/or the waiting phase, ensure an extraction throughout its volume.

The outflow of gas (during phase (ii)) toward a second (auxiliary) container can convoy with it the interstitial fluid extracted from the solid part, wherein the effect of the pressure difference between the two containers constitutes an advantageous alternative to a mechanical pump. The method can thus be exploited to drain, from a main container (preferably closed) containing a crushed vegetable material with liquid and solid part, the liquid part in the auxiliary container. It is preferable to interpose along a connection, e.g. flow-adjustable, between the two containers and/or on the bottom and/or in the side walls of the main container, filters to retain the solid part but not the liquid one, e.g. grids or sieves.

The quality of the must/liquid obtained by the method is clearly superior to the traditional one because:
- by repeating in sequence the steps (i) and (ii), and optionally that of waiting, the diffusion and the effect of the gas increases;
- the waiting time $T_{att}$ allows excellent gas diffusion in the interstitial liquid and/or a diffusion by capillary action of the remaining liquid part within the interstices of the mass/solid part, the latter also already emptied, and of the draining sectors;
- the opening of the communication between the two containers (e.g. wherein the container receiving the must or the liquid part is placed at a lower pressure compared to the overall pressure present at the draining valve of the main container), expulsion of pressurized fluid (interstitial or not) occurs toward the auxiliary container;
- the marc is not pressed mechanically and, therefore, the peel or solid part of it does not break;
- by pressurizing the (main and/or auxiliary) container with inert gas, the must/liquid soaked of inert gas in turn dissolved due to the pressure is still better protected and inertized in the phases of pressing the marc (solid part) and therefore does not oxidize;
- the gas, in its transition from liquid to gas in step (ii), "opens" the solid part or grape marc: this divaricating effect increases the wet surface of the solid part exposed to the gas and enhances the yield of extraction of interstitial liquid (real "drainage channels" are created in the solid part or marc).

The extraction of interstitial fluid (e.g. after racking of the first must) preferably takes place through cycles of pressurization of the container containing the marc or solid part and depressurization cycles of the inner cavity of suitable draining sectors arranged inside of the container, e.g. on the walls at said lower part. The method can be exploited also to facilitate the extraction of the initial greater percentage of the liquid part (juice), and/or subsequently to extract the liquid by which the solid part remains soaked. To the purpose before the step (i) the liquid part can be evacuated until the wet solid part accumulates on the bottom of the container. Then the main container is put into communication with the auxiliary container at a point close to said bottom or at the bottom (which preferably has sieve or grid means to filter out the solid part).

Said lower part or point near the bottom (where in use there is present the solid part) can be—in general—the bottom of the container or the adjacent vertical walls, e.g. in the neighborhood of or in the belt up to 1 m from the bottom and/or within the belt between the bottom and up to 25% or 35% of the container's height from the bottom.

An example of cyclical phases during the operation of draining can be:
 1. step (i);
 2. waiting for a time $T_{att}$;
 3. step (ii), which occurs e.g. by opening a conduit for the interstitial liquid toward the outside of the main container. The step (ii) may be timed and last a time $T_{liq}$, e.g. with $T_{liq}<=60$ seconds or 60 seconds$<=T_{liq}<=180$ seconds, values that allow the extraction of the must until the drainage channels inside the marc or solid part does not close and therefore must dos not come out anymore from them;
 4. return to step 1.

An example of cyclical phases during a phase of maceration may instead be:
 1. step (i);
 2. waiting for a time $T_{att}$;
 3. step (ii), obtained e.g. by venting the gas toward the outside of the container;
 4. return to step 1.

To better control the process in step (i) and/or in the waiting step the gas pressure inside the main container can be increased until reaching a maximum threshold pressure, or one can act on the auxiliary container, or act on both the containers. During the points 3. described above, there may be a precise control of pressure and/or its time course, in particular said pressure can be decreased from the maximum threshold to a minimum pressure threshold, preferably according to a programmed course and/or a decrease of predetermined duration. That maximum and/or minimum threshold may vary during subsequent cycles of pressurization of the container, in order to diversify the effect of it on the solid part and e.g. to increase the extraction of liquid. Said pressure thresholds and/or a programmed course of the pressure can be programmed in a logical unit (e.g. a PLC), with the advantage of automating the process and creating ad hoc programs according to the type of crushed grapes. To this aim, the logic unit can control the pressure of the (main and/or auxiliary) container with sensors and suitably drive means for gas injection and/or means for depressurization, e.g. vent valves.

E.g. the pressure in the auxiliary container can be another convenient process variable. One can leave it at atmospheric pressure (if e.g. it is open) or maintain it at a lower pressure than atmospheric pressure (or e.g. at an internal pressure of at least 200 mbar lower than that in the main container at the point of the draining valve), so as to increase the pressure differential with respect to the main container.

The use of an auxiliary closed container (e.g. equipped with valves for closing/opening it to the outside, either manual or automatic, and/or for launching liquid to other containers, and/or equipped with at least one entry point of saturation/pressurization-depressurization gas in the lower part of the container) is preferable because it has advantages such as e.g.:

it allows to pre-inertizing its interior e.g. with inert gas;
 it allows to control its internal pressure, in order to regulate more finely the desired pressure differential with respect to the main container;
 by depressurizing the auxiliary container one can maximize said pressure differential in order to maximize the drainage effect of the liquid part.

The way in which the communication between the main container and the auxiliary one is enabled (e.g. by controlling valve means) allows different effects of draining, dependent on the type and quantity of the solid part (e.g. peel). E.g. the extraction of interstitial fluid is improved by putting in communication the two tanks at predetermined time intervals $T_{COMM1}$ and/or enabling the communication for intervals of predetermined duration $T_{COMM2}$, where e.g. $T_{COMM1, COMM2}$=30, 60, 120, 180, or 360 sec. In general, the timing of the system should be adapted to the type of pressed grapes, advantageously e.g. by programming the software of the logic unit. This unit can control e.g. the choice of gas pressurization, the cycles of opening and closing of valves, e.g. draining valves or gas vent valves, the timings, like e.g. the times $T_{att}$, $T_{liq}$ and $T_{COMM1, COMM2}$, and typically the entire apparatus or system of fermentation.

The method can be used in combination with the other techniques of pressing, e.g. supplementing a traditional membrane press, e.g. for crushed material and marc.

It is also proposed a container or fermenter or system adapted to or for implementing the method. In general, such apparatus can comprise means adapted for carrying out a or each phase of the method, by the ways described above.

In particular, an apparatus or system is disclosed with a (main) container to contain solid and/or wet part of a crushed vegetable material comprising
 (i) means for increasing the gas pressure inside the container so that the gas dissolves or diffuses in said liquid part;
 (ii) means for decreasing the pressure of gas.

The means for increasing can be implemented with means for injecting a gas inside the lower part of the container where in use there is present at least some solid part and preferably so that the gas invests such solid part, or with valve means adapted to let the internal volume of the container communicate or not with the outside (by isolating the main tank from the outside the fermentation processes of the crushed material inside generate gases that gradually increase the pressure).

Singly or in combination the apparatus or system may comprise
 as means for decreasing: a communication fluid connection between the main container and an environment at lower pressure, e.g. an auxiliary container at an internal lower pressure, or the external environment, e.g. at atmospheric pressure (e.g. the outside of the main container). In case of must transfer with "delestage" technique and/or drainage of marc, said means for decreasing may comprise a connection for fluid-communication between the lower part of the main container and an environment at lower pressure, e.g. an auxiliary container at lower inner pressure. While in the case of maceration, said means for decreasing may comprise one or more depressurization valves placed in the upper part of the main container, so as to open in a controlled manner the interior of the main container towards the environment at atmospheric pressure (e.g. the outside of the main container);
 for the transfer of must and/or drainage of the marc, a sieve or grid filter or filter means or means for sieving, placed on the inner surface or bottom part of the container in correspondence, in use, of said solid part and in communication with said connection and adapted to be passed-through by the interstitial liquid to let it get out of the container through the connection and retain the solid part;

means for injecting gas inside the container to increase said pressure;

gas diffusing means or members with a gas outlet placed at one or more points belonging to the internal volume of the lower part of the main container, in correspondence (in use) of the solid part;

valve means for enabling communication between, or venting, the main and auxiliary container or said environment;

one or more inflatable bodies to compress the solid and wet part to press liquid out of it;

a regulator or computer or electronic control unit adapted to control a or each means described before and/or said environment, preferably in such a way as to 1. increase the gas pressure inside the main and/or auxiliary container until reaching a maximum or minimum pressure threshold so that the gas dissolves in said liquid part, and/or so as to vary the threshold during cycles of pressurization of the main and/or auxiliary container (e.g. via a user interface, such as a keyboard or a touch-screen), and/or 2. time the action of a or each means described before, and/or 3. control the valve means for their opening and/or closing e.g. at specified time intervals and/or during intervals of predetermined duration $T_{COMM1}$, $_{COMM2}$, and/or 4. control the condition of inflation/deflation of the inflatable body/bodies.

In particular, the system may comprise a container or press for crushed material, an electronic unit adapted to control means for increasing the gas pressure inside the container or press, means for reducing the gas pressure inside the container or press, wherein the electronic unit is configured to sequentially (1a) command the means for increasing in order to obtain an increase in the gaseous pressure inside the container, and (2a) command the means for decreasing to decrease the gas pressure inside the container.

Preferably said means for increasing comprises means for injecting gas into the container or the press, preferably in the lower part of the container where in use there is the crushed material.

The electronic unit can be adapted to control e.g. also the means for increasing and/or decreasing the volume of the inflatable bodies.

The electronic unit is preferably timed o provided with a timer to wait a waiting time (see waiting phase above) between activity (1a) and the activity (2a) and/or to perform activities (1a) and (2a) cyclically. Note the correspondence between the phases (i), (ii) of the method and activities (1a), (2a) of the operation in the logic unit.

The advantages of the invention will be more apparent from the following description of a preferred embodiment, by reference to annexed drawing in which FIG. 1 shows a front view of a fermenter apparatus capable of implementing the method, FIG. 2 shows a front view of the apparatus of FIG. 1 in different configuration (transfer phase for pressurized delestage);

Figure 9:
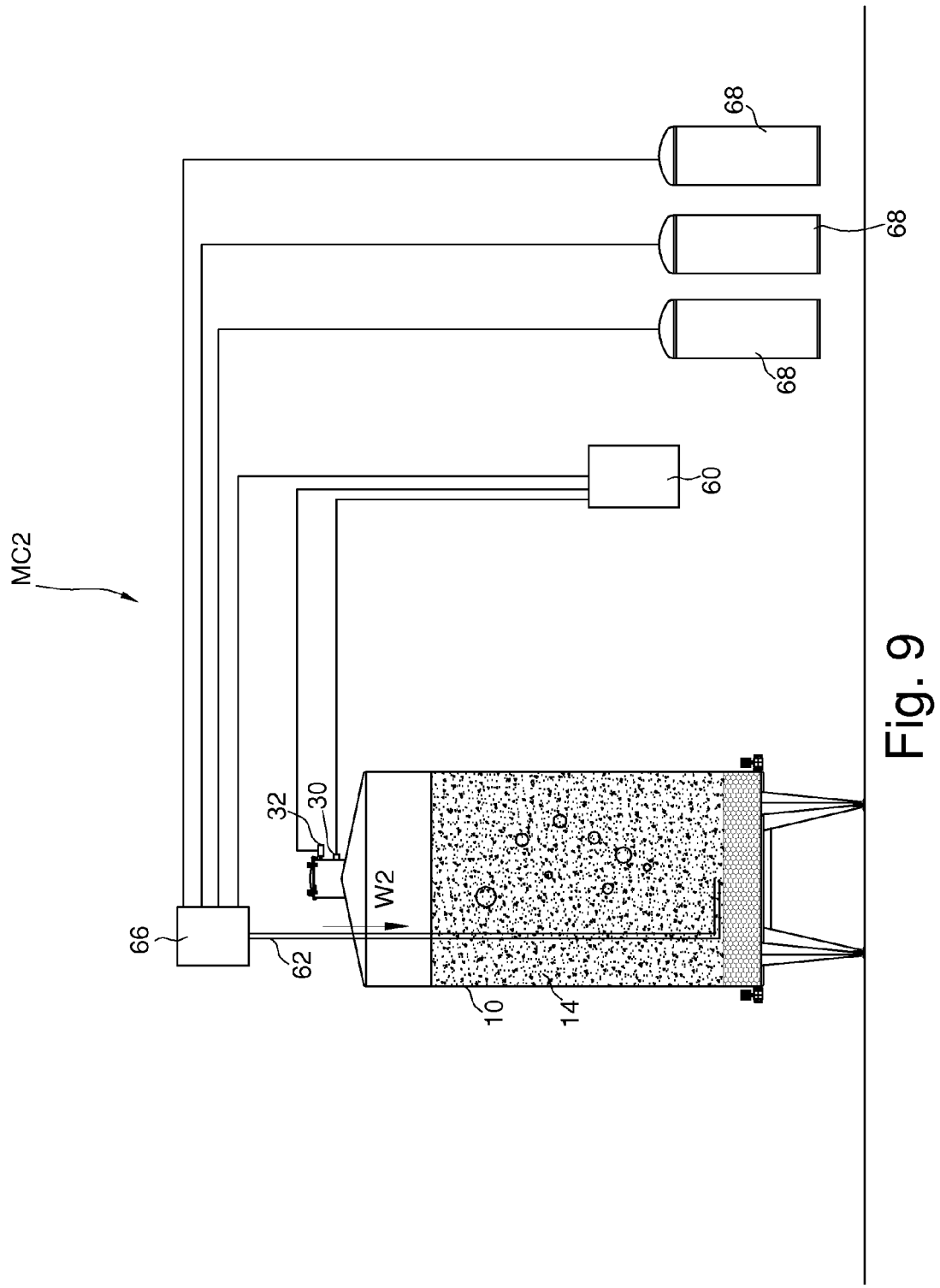
Figure 10:
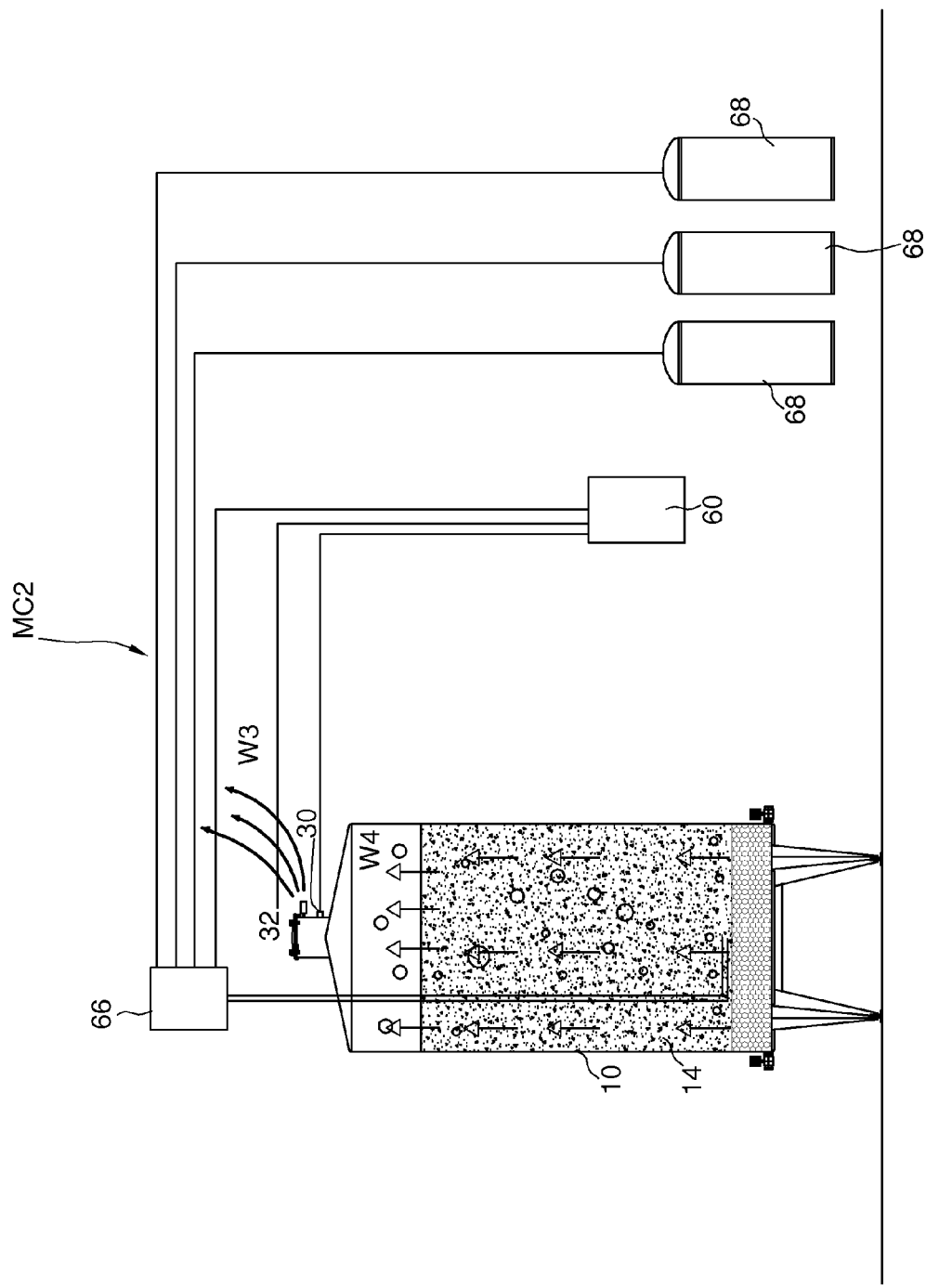
Figure 11:
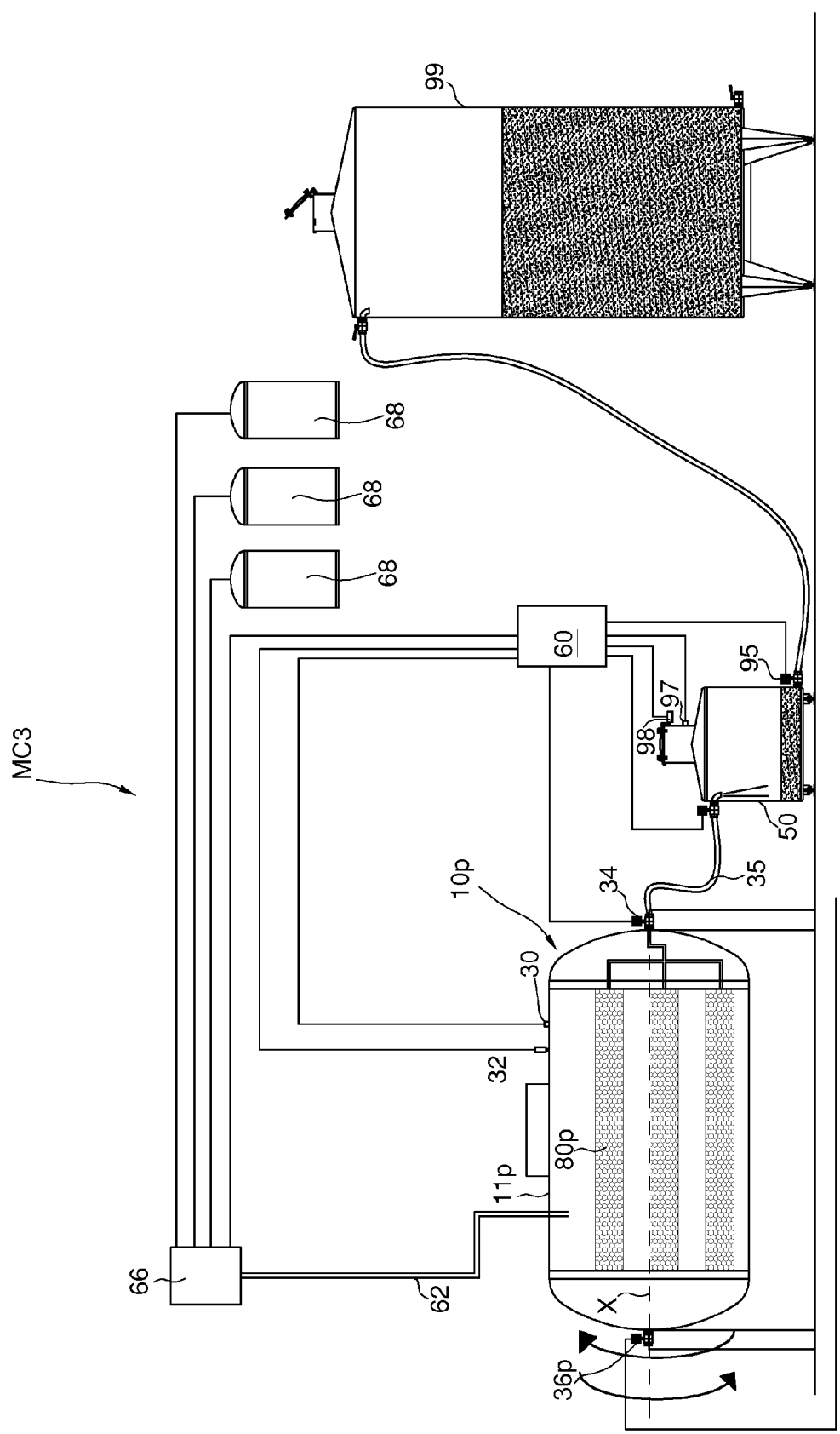

FIGS. 5, 6, 7, and 8 show sectional views of successive steps of the draining process for the must;

FIG. 9-10 show a front view of a third variant of apparatus;

FIG. 11 shows a front view of a fourth variant of apparatus.

In the description and in the various drawings the same references indicate equal parts. So the parts indicated by the same number, but for brevity not every time described, share the same description.

A system of fermentation MC (FIG. 1) comprises a main fermentation tank 10, which contains must which by fermenting has generated a marc cap 16.

The tank 10 is equipped with a pressure sensor 30 and a gas-pressure regulating valve 32 (near an upper hatch). The valve 32 serves both to open/close the upper part of the tank 10 (for depressurizing it), and to finely adjust the internal pressure. It is more advantageous to use two different valves: one for the depressurization and one for fine adjustment of the pressure, to adjust with greater precision the pressure inside the tank because the needs of a rapid depressurization and of a fine-adjustment require different valves. For the depressurization it can be arranged a valve with passage section of at least 20 mm in diameter, while for the pressure regulation the use of a valve having a maximum passage section of 10 mm in diameter.

The lower walls and/or the bottom of the tank 10 comprise a grilled belt or draining sectors 80 capable of letting liquid to pass but retaining macroscopic solid parts (see FIGS. 5-8). The sectors 80 comprise a interspace 82 in which the filtered liquid can accumulate.

Valves 34, 36 can selectively put into communication the sectors 80 with, respectively, a first-must storage tank 40 and a draining tank 50 through a draining pipe 35. At the bottom of the tank 10 one or more nozzles 62 for gas injection open, said gas coming from controlled gas delivery means 66 for gas taken and/or mixed selectively from cylinders and reserves 68. Preferably the nozzles 62 lead into approximately the center of the tank 10 or on an inner radius far from the side walls.

A PLC or processing unit 60 is interfaced with the sensor 30, the valves 32, 34, 36, the nozzles 62 and the means 66, in order to control them in general, and in particular to detect data therefrom and monitor the opening/closing state or activity thereof. Note that the valves 34, 36 may be manual, and that the finely pressure-regulating valve may also be of mechanical type.

Phases of Operation (here and in the following the actions carried out by the components are advantageously meant to be driven by unit 60, but also a manual intervention is possible).

Figure 1:
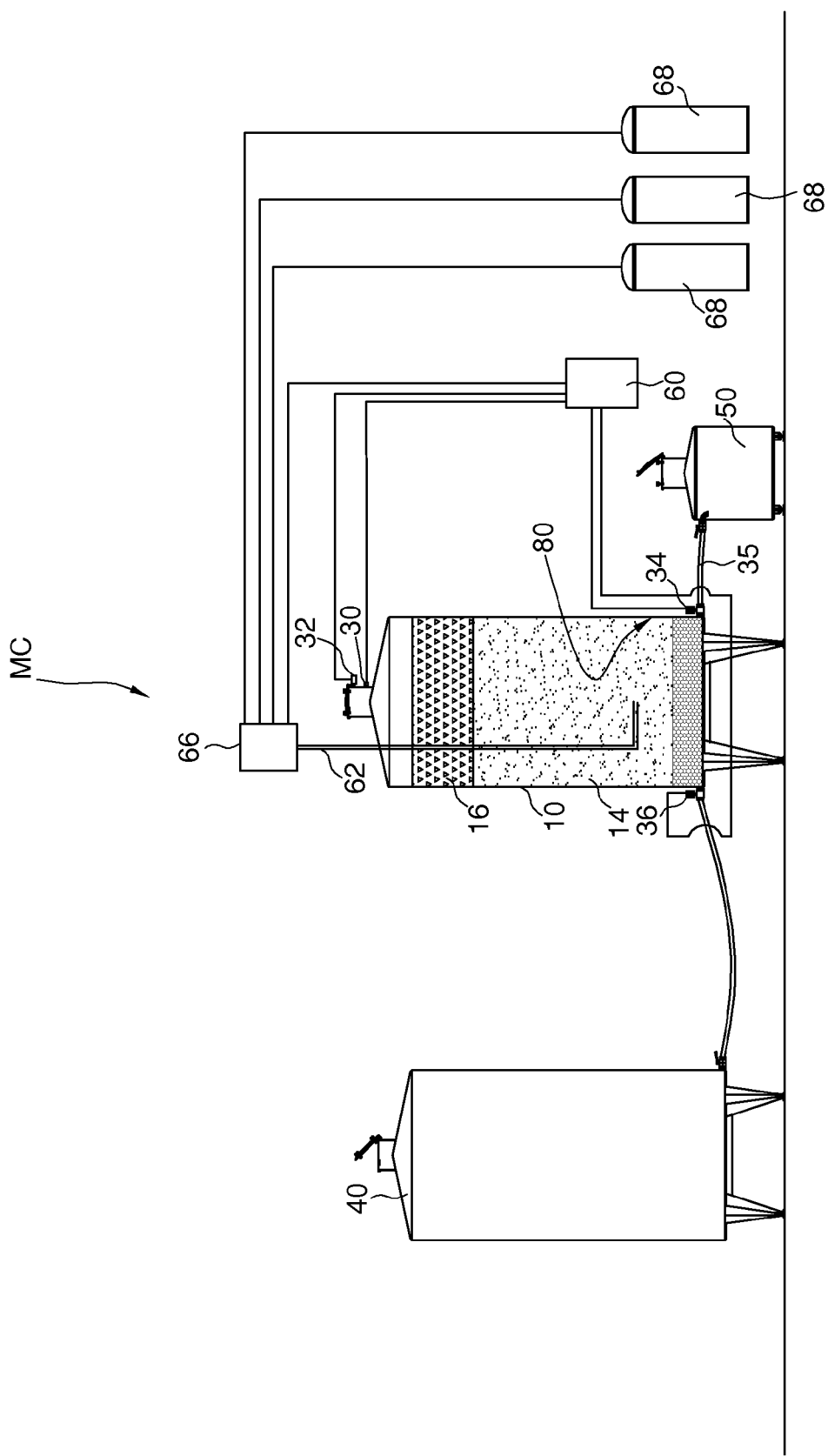

1) The tank 10 is filled with crushed grapes, which has formed a floating marc cap 16 on a liquid part 14 (FIG. 1). If the alcoholic fermentation is not started, the mass of must and peel is mixed without a marc cap. The invention operates in both cases, and also when fermentation is finished.

Figure 2:
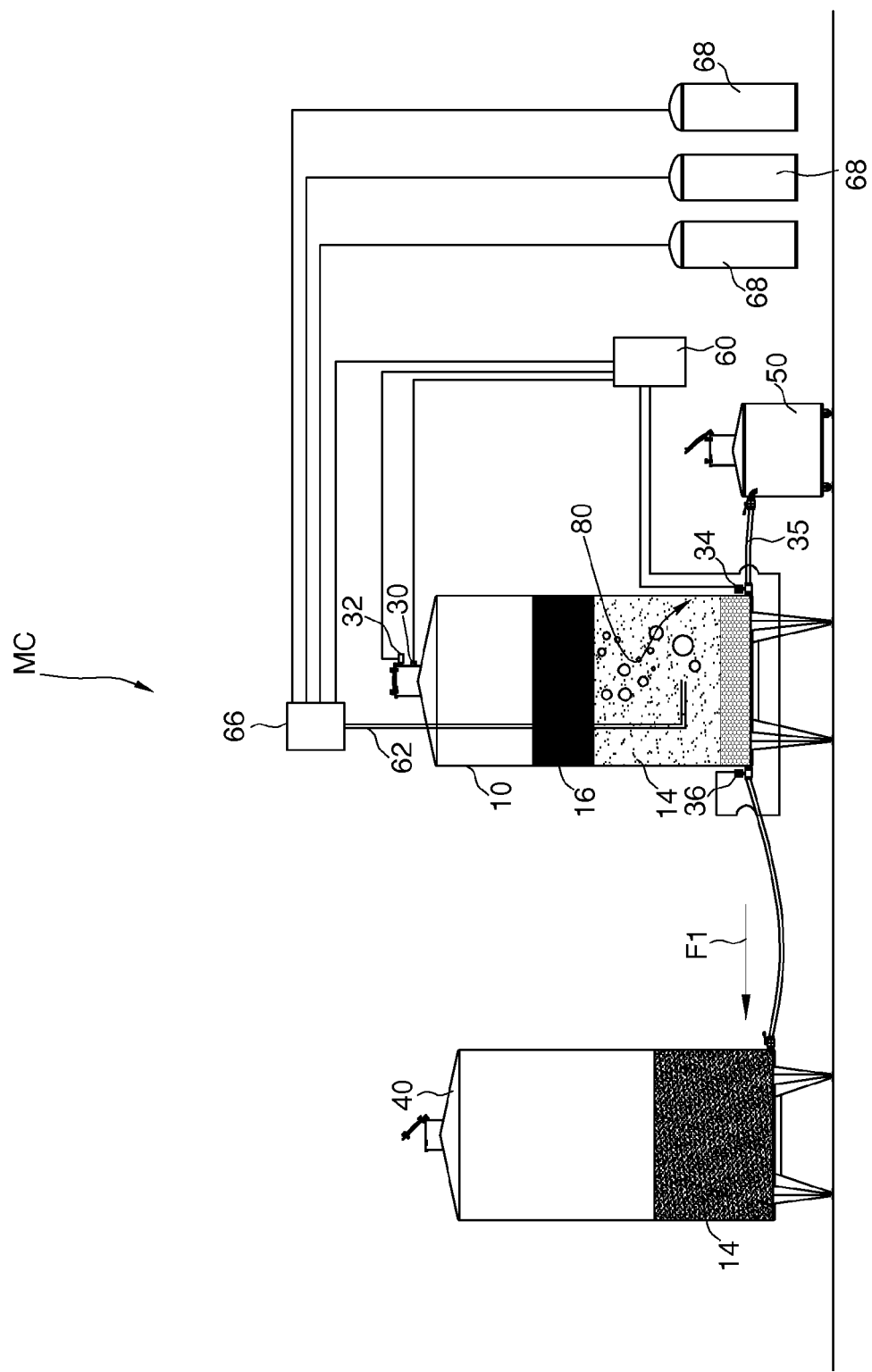

2) If the first juice is not already extracted, one can optionally exploit a pressurization of the tank 10 as a method of first draining towards the tank 40 (FIG. 2).

The pressure in the tank 10 is increased by selecting which gas to use among the cylinders 68 and by injecting gas from means 66, or if the mass of crushed material is under alcoholic fermentation, one can use the $CO_2$ generated by fermentation as a pressurization gas. When the pressure in the tank 10 has reached a programmed value the valve 36 is opened and the juice flows into tank 40 (see arrow F1 in FIG. 2). One can set in the unit 60 a range or threshold pressure below which the valve 34 closes and above which it opens. If one uses an external gas, the gas injection is through the pipe or nozzles 62 immersed in the crushed material, and this will facilitate the dissolution of the gas in the liquid part, very useful in the next step.

The program of unit 60 may provide for a maximum time of draining $T_{MS}$ of the juice, or one can insert a probe into the tank 10 that indicates the achievement of a minimum level of liquid, below which cycles of pressurized draining of the marc 16 (phase 3) begin.

Or one can apply to the valve 36 a flow sensor that signals the moment when the juice is completely drained.

Figure 3:
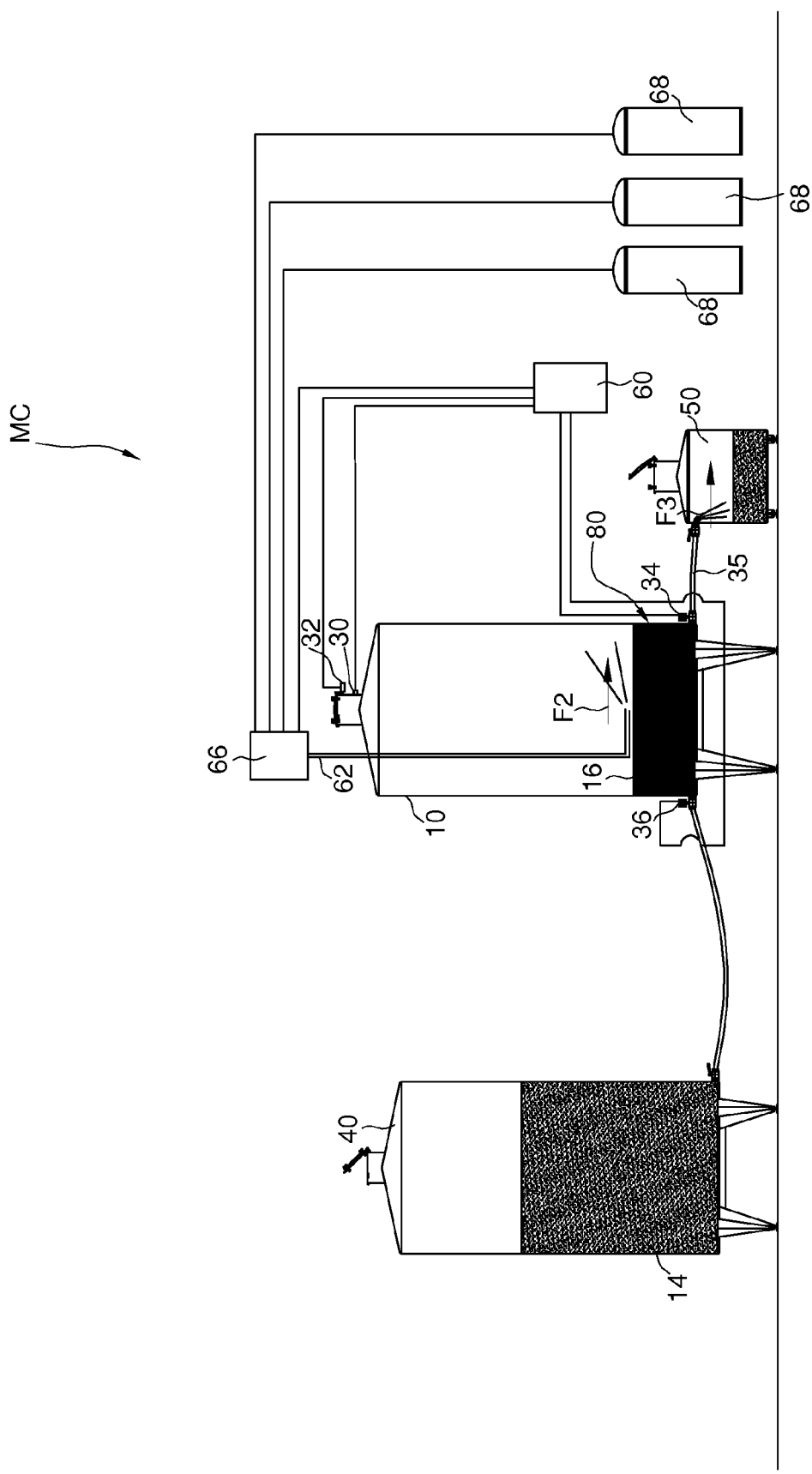
FIG. 3 shows a front view of a variant of the apparatus (phase of draining must)

In any case, when almost all of the liquid is removed, the marc or solid part 16 accumulates on the bottom of the tank 10 (FIG. 3).

Note that regardless of the method of primary draining for the first juice (must), by using e.g. pressurization of the empty bottom part of the tank 10 (the pressurized gas behaves as a mechanical piston) or by pressurization of one or more internal membranes to the tank or to the press or, finally, by gravity and/or by using a pump, at a certain point the marc 16 laid on the bottom will not release more juice. The pressure of the gas on the marc 16 deposited on the bottom, or its own weight, or the mechanical pressure of said membrane, compact it transforming it into a sort of plug that prevents the outflow of the residual must. The wet skins, adhering to the walls of the sectors 80, plug the holes thereof.

Experimental tests have shown that when the cap 16 is lying on the bottom a further increase of the internal pressure does not cause any drainage of the residual must. Even continuous depressurization of pipe 35 does not determine, beyond a certain point, any drain of the residual must. Indeed, as for the known pressing membranes, after draining the part of must present in the skin adjacent to the internal draining sector 80, the marc ends up compacted on the surface of the sectors 80, hindering further drainage and leaving a substantial amount of juice inside the grape skins.

3) the pressure in the tank 10 is increased (FIG. 3), which tank is pressurized with a gas selected by the unit 60 and put in by the nozzles 62 (see arrow F2). The gas is preferably inert and highly dissolvable in the residual liquid part due to the pressure. Gas suitable for the purpose are e.g. $CO_2$ or nitrogen.

The pressure inside the tank 10 in case of maceration by saturation is preferably brought to values between 0.2 and 2 bar, typically related to the consistency of the skins contained in the must to be macerated.

The pressure inside the tank 10 in case of pressing by saturation is preferably brought to values between 0.2 and 6 bar, generally related to the amount of liquid to be extracted, or to the degree the marc 16 is to be dehydrated.

It is advisable, if one wants to achieve a high level of dehydration for the marc 16, to proceed at various levels of increasing pressure, e.g. with series of cycles at 0.5 bar, series of cycles at 1 bar, series of cycles at 1.5 bar, etc.

It is good that the injection of gas takes place in the lower part of the tank 10 and in any case in the internal mass of the marc/liquid 16. To the purpose it is preferable to use multiple nozzles 62, e.g. two to ten, so as to better distribute the gas within the mass of wet marc.

The pressurization with resulting saturation, with or without a successive period of inactivity, can last e.g. 60 seconds to 12 hours (in relation to the type of grape or grape marc 16).

4) during the maceration by saturation the valve 32 is opened after waiting for a time unit $T_{att}$ from when pressure has reached saturation pressure $P_S$ set inside the tank 10. This causes the transformation of a limited quantity (proportional to: the density of the must, type of gas used, pressure $P_S$, saturation time and amplitude of the pressure reduction) of liquid gas saturated in the must in the form of gas microbubbles. The generated gas has a gentle "erosive" effect on the soft part of the peel and a capillary upwards dragging, i.e. towards the outside of the tank 10, of residual oxygen in the mass. Then the injection of gas proceeds up to attaining the value of the initial pressure $P_S$ (e.g. 400 mbar), a time $T_{att}$ is waited for, then the valve 32 is opened until the pressure drops by a certain decrement VP, e.g. of 50 mbar, then the pressure is restored by injection into the crushed material of saturation gas going back to the $P_S$ value. During pressing by saturation the planned cyclic opening of valve(s) 34 occurs, resulting in depressurization of the interspace 82 and spilling of must toward the tank 50 (see arrow F3 and FIG. 6). This must is both the one dripped inside the interspace 82, and the one expelled from the marc 16 adjacent to the sector 80 due to transformation of gas, previously dissolved into the must, into free gaseous state (see arrow F4).

The sudden transformation of gas from liquid into gaseous state, that takes place in layers of the marc 16 adjacent to the sectors 80, ejects and sucks up the liquid part that meets on its way toward the valve 34. The drainage effect is intensified by the fact that the gas, passing abruptly from liquid to gaseous state, increases in volume, therefore on the one hand it opens the marc 16, preventing that this compacts and thereby favoring the drainage, on the other it erodes only the residual part of liquid and pulp present in the marc 16 and conveys it to the outside.

The valve opening 34 can last e.g. 30 seconds to 30 minutes, its closure e.g. 60 seconds to 30 minutes in relation to the time of gas saturation in the liquid remaining in the marc 16 adjacent to the draining sectors 80.

Then the valve 34 is closed (FIG. 7) and opened again (FIG. 8), for a number of cycles, which can go e.g. from 10 to 50.

Because of the "opening" of the marc 16, in turn caused by the sudden transformation of the gas dissolved in the must due to the differential between internal pressure of the marc cap 16 and pressure of the tank 50, cycle by cycle the must inside the grape marc 16 will flow to the interspace 82 and from there it will be expelled to, and collected in, the tank 50. Time after time the must will migrate from the center to the periphery of the marc 16, where there are the sectors 80, and a dry zone 85 of marc expands towards the center. In particular:

- when the valve 34 is closed again (FIG. 7), in the layers of marc 16 adjacent to the sector 80, now emptied and divaricated, the accumulation of new must rich of liquid gas begins. This must also will invade again the interspace 82 (arrow F5);
- by re-opening the valve 34 (FIG. 8) one expels the must contained in the interspace 82 plus that sucked up (see arrow F6) by the depressurization of the adjacent layers 85 of marc 16.

The number of cycles being equal, the efficiency of drainage can be increased by increasing the pressure in the tank 10 or by decreasing that in the tank 50, e.g. by providing it with a vacuum pump.

Figure 4:
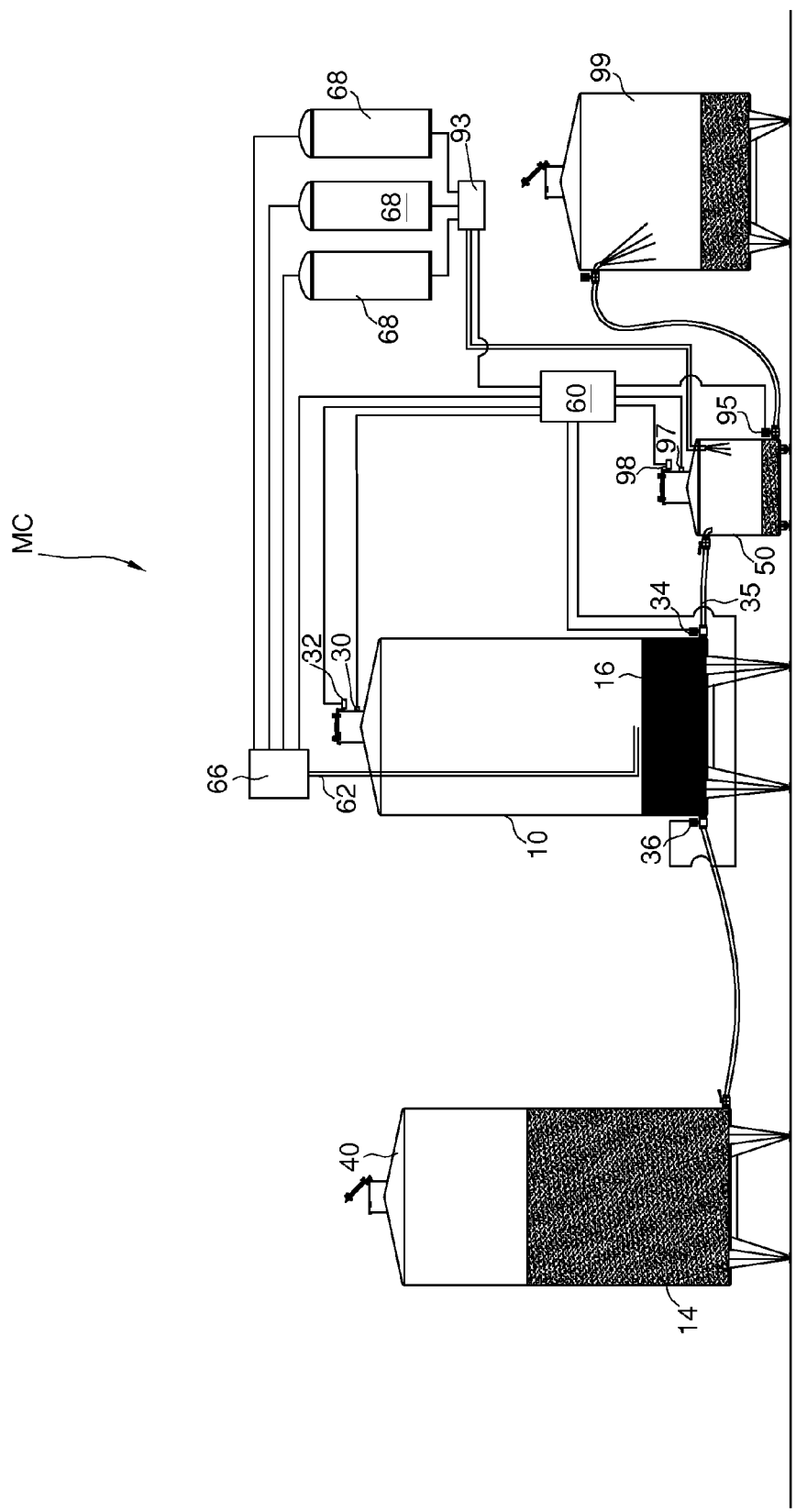
FIG. 4 shows a front view of a second variant of apparatus.
Figure 5:
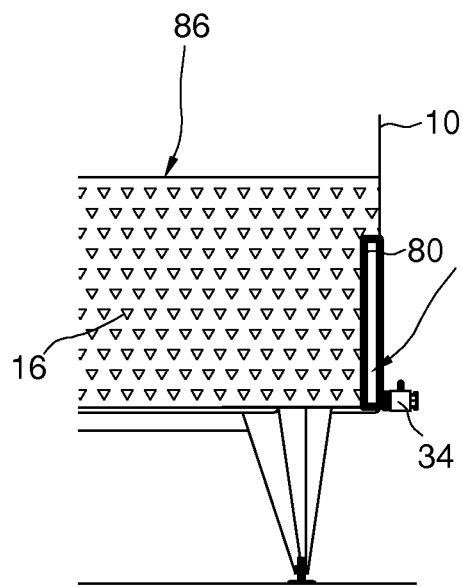
Figure 6:
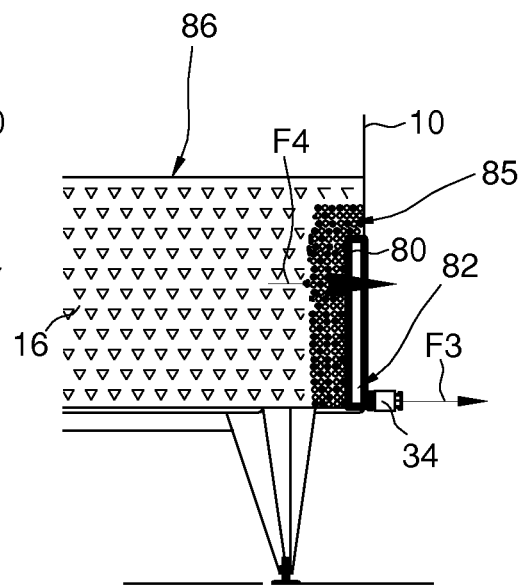
Figure 7:
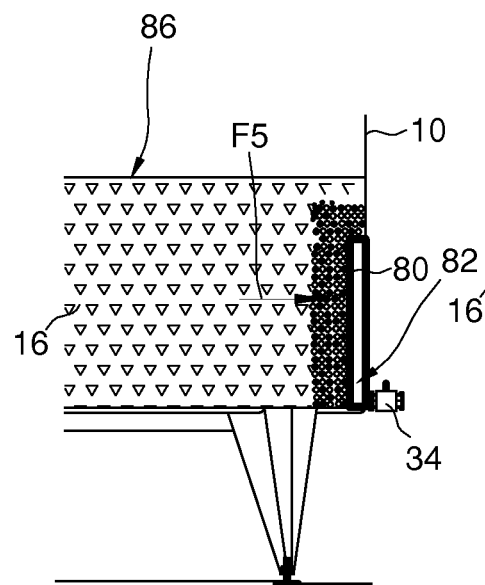
Figure 8:
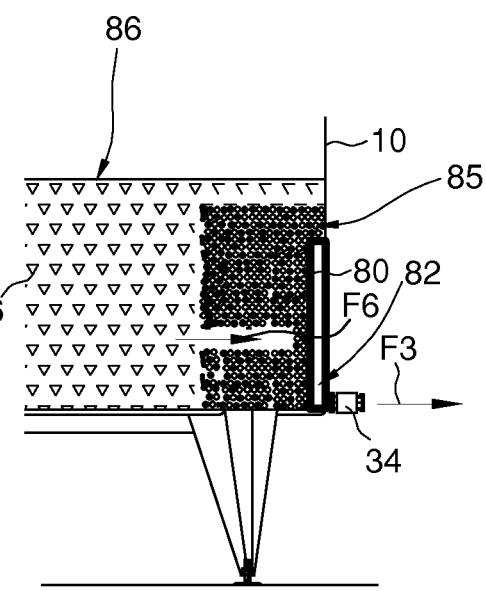

The tank 50 can also be used as a relaunch-tank of the drained must toward another tank 99 (FIG. 4). It is enough to pressurize the tank 50 with inert gas and provide it with a pressure-adjustment valve 98, a pressure sensor 97, a point of injection of gas coming from a mixer/dispenser 93 and a further drain valve 95, the whole connected to the unit 60 for the control, or to another electronic unit. The operation is the same as described for the tanks 10, 50.

To increase the efficiency of the sectors 80 it is advantageous that
 they are positioned circumferentially on the bottom of the tank 10 (in the case of a press or a horizontal tank the sectors may be longitudinal or internal to the container itself) and/or
 they are structured as draining septa movable in a controlled manner inside the tank 10 and able to spread apart the marc (e.g. mounted on or constituting a scraping blade rotatably mounted on the bottom of the tank 10);
 they have a total area greater than:
  0.5 m$^2$ per 100 hl of capacity of the tank 10 where the latter is a fermentation or maceration tank loaded with crushed material; or
  2 m$^2$ every 100 hl of capacity of the tank 10 where the latter is a press for marc.
 they have a perforated surface (which acts as a separator between the skin and the liquid part) of at least 30% compared to the total, with a size of the holes such as to prevent the passage of the peel.

The above mentioned parameters for the sector 80 define the optimal surface of pressurized drainage of the marc 16 as shown by experimental tests.

In the example of FIG. 1-2 the two tanks 50, 40 are open and distinct. One may use however two closed tanks equipped with appropriate valves for adjusting pressure and gas injection, and one might use a single tank for receiving must.

FIGS. 9-10 show an apparatus MC2 which has substantially the same structure of FIG. 1 and is working for the maceration of a crushed material 14 placed in the tank 10.

Operation

Phase a: The unit 60 injects (FIG. 9, see arrow W2) in the mass of crushed grapes 14 some gas taken/mixed from reserves 68 through the pipe 62. The resulting pressurization of the tank 10 determines the saturation of the mass of crushed material 14 with the gas dissolved and released in it (Henry's law). The amount of injected gas can be controlled for its flow rate or by the sensor 30.

Phase b: (optional) a certain time is waited for to ensure the saturation of the mass of crushed grapes 14 by the gas.

Phase c: (FIG. 10) the valve 32 is opened causing a depression in the tank 10, and thus a gas flow (see arrow W3) toward the outside. The drop of pressure returns the dissolved gas to a gaseous state, which gas thus comes out from the liquid (arrows W4). The microbubbles of gas rising in the mass of crushed grapes 35 aggregate oxygen molecules and drag them outside of the tank 10.

Repeated for n cycles the phases a-b-c one will come to a complete deoxidation of the crushed grapes 14.

FIG. 11 presents an apparatus MC3 which has substantially the same operation of the one in FIGS. 1-8 but takes advantage of the inventive principle by applying it on a known press 10p, e.g. equipped with a drum 11p having rotating horizontal axis X provided with known draining sectors 80p and a valve 36p for loading must controlled by the unit 60. The press 10p can have or not an inner inflatable membrane. Essentially, the press 10p may replace the tank 10 in each variant described above, while the components external to the press 10p are the same of the previous figures.

Without repeating the steps of operation, which is the same, just note that the press 10p can be the location of the illustrated maceration and/or pressing method.

The invention claimed is:

1. A method for processing a previously crushed vegetal material, which has a solid part and liquid part and is placed inside a main container, said method comprising the steps of:
 (i) increasing the gas pressure inside the main container so that the gas dissolves or diffuses in said liquid part; and
 (ii) decreasing the gas pressure inside the main container by connecting the main container to the auxiliary container, so that gas previously diffused into the solid part reacts coming out of the solid part and bringing along fluid that stays in the solid part and interstices thereof; and
 (iii) collecting in the auxiliary container a liquid part expelled from the solid part together with the gas due to expulsion of the same gas caused by depressurization in the step (ii), wherein filters are interposed between the main container and the auxiliary container to retain the solid part but not the liquid part, such that the solid part is retained in the main container, and the liquid part is collected in the auxiliary container.

2. The method according to claim 1, wherein there is a waiting time ($T_{att}$) between step (i) and step (ii).

3. The method according to claim 1, wherein in step (i) a gas is injected into the main container by making the gas enter into the lower part of the main container where in use there is the crushed vegetal material so that the gas dissolves in said liquid part.

4. The method according to claim 1, wherein the solid part is made to settle on the bottom of the main container and during step (i) the gas is injected inside said solid part.

5. The method according to claim 1, wherein steps (i) and (ii) follow each other in sequence cyclically.

6. The method according to claim 1, wherein step (i) is carried out by injecting a gas into the main container.

7. The method according to claim 1, wherein step (i) is carried out by injecting a gas at the bottom of the main container where in use there is the crushed vegetable material.

8. The method according to claim 1, wherein step (i) is carried out by migrating gas in/from an external inflatable bag connected to the main container.

9. The method according to claim 1, wherein step (i) is carried out by using a controlled connection with a second auxiliary container at a higher pressure.

10. A system, comprising:
 a main container for crushed vegetal material including a solid part and a liquid part;
 an auxiliary container connected to the main container;
 filters interposed between the main container and the auxiliary container to retain the solid part but not the liquid part;
 an electronic unit adapted to control a device configured to increase the gas pressure into the main container; and
 a device configured to decrease the gas pressure in the main container, wherein the electronic unit is configured to sequentially:
drive the device configured to increase the gas pressure to obtain a gas pressure increase inside the main container so that the gas dissolves or diffuses in the liquid part;
wait for a waiting time (Tatt); and
drive the device configured to decrease the gas pressure to reduce the gas pressure inside the main container so that the gas dissolved in the liquid part returns in gas form.

11. The system according to claim 10, wherein the device configured to increase the gas pressure comprises an injector configured to inject a gas inside the lower part of the main container where in use there is present at least some solid part, so that the gas invests such solid part.

12. The system according to claim 10, wherein the device configured to increase the gas pressure comprises a valve adapted to let the internal volume of the main container communicate with the outside or not communicate with the outside.

13. The system according to claim 10, wherein the device configured to decrease the gas pressure in the main container comprises a communication fluid connection between the main container and an auxiliary container at an internal lower pressure.

14. The system according to claim 13, wherein the connection for fluid-communication is arranged between the lower part of the main container and the auxiliary container.

15. The system according to claim 13, wherein said filters comprise a sieve or grid filter or means for sieving, placed on the inner surface or bottom part of the main container in correspondence, in use, of said solid part and in communication with said connection and adapted to be passed-through by the liquid to let it get out of the container through the connection and retain the solid part.

16. The system according to claim 13, further comprising a valve configured to enable communication between the main container and the auxiliary container.

17. The method according to claim 1, wherein the step (i) is carried out by mechanically varying the volume of the main container.

* * * * *